United States Patent
Byers (10) Patent No.: US 11,933,690 B2
(45) Date of Patent: Mar. 19, 2024

(54) INSPECTING AN INTERIOR OF A GAS TURBINE ENGINE APPARATUS

(71) Applicant: Pratt & Whitney Canada Corp., Longueuil (CA)

(72) Inventor: Justin Byers, Pembroke (CA)

(73) Assignee: Pratt & Whitney Canada Corp., Longueuil (CA)

( * ) Notice: Subject to any disclaimer, the term of this patent is extended or adjusted under 35 U.S.C. 154(b) by 124 days.

(21) Appl. No.: 17/497,540

(22) Filed: Oct. 8, 2021

(65) Prior Publication Data

US 2023/0115111 A1  Apr. 13, 2023

(51) Int. Cl.
G01M 15/14 (2006.01)
G02B 23/24 (2006.01)
H04N 7/18 (2006.01)
H04N 23/50 (2023.01)

(52) U.S. Cl.
CPC ......... *G01M 15/14* (2013.01); *G02B 23/2484* (2013.01); *H04N 7/183* (2013.01); *H04N 23/50* (2023.01); *H04N 23/555* (2023.01)

(58) Field of Classification Search
CPC ... G01M 15/14; G02B 23/2484; H04N 7/183; H04N 23/50; H04N 23/555
See application file for complete search history.

(56) References Cited

U.S. PATENT DOCUMENTS

| | | | |
|---|---|---|---|
| 6,346,940 B1 | 2/2002 | Fukunaga | |
| 7,231,826 B2 | 6/2007 | Bossi | |
| 9,458,735 B1* | 10/2016 | Diwinsky | F01D 21/003 |
| 9,681,107 B2 | 6/2017 | Hatcher, Jr. | |
| 10,902,664 B2 | 1/2021 | Xiong | |
| 11,668,773 B2* | 6/2023 | DeBiccari | G01N 27/87 324/228 |
| 2010/0205816 A1* | 8/2010 | Wu | G01B 5/008 33/503 |

(Continued)

FOREIGN PATENT DOCUMENTS

GB  2587794 A  4/2021

OTHER PUBLICATIONS

Martin et al. "Real Time Tracking of Borescope Tip Pose", Third IEEE Workshop on Applications of Computer Vision, WACV '96, Dec. 2, 1996, pp. 123-128.

(Continued)

*Primary Examiner* — Eric S. McCall
(74) *Attorney, Agent, or Firm* — Getz Balich LLC (57) ABSTRACT

During an inspection method, an inspection scope is inserted into an interior of an apparatus of a gas turbine engine. An image of the interior of the apparatus is captured to provide/output image data. A location of the inspection scope within the interior of the apparatus when the image is captured is determined to provide location data, where the determining of the location includes comparing the image data to model data from a model of the apparatus. During the course of inspection, movement of the inspection scope is tracked within the interior of the apparatus using the location data. The location data may be derived by feature recognition and/or motion tracking of live feed from a scope video output to features available in a field of view within duplicate CAD model.

17 Claims, 6 Drawing Sheets

(56) References Cited

U.S. PATENT DOCUMENTS

| | | | |
|---|---|---|---|
| 2010/0207619 A1* | 8/2010 | Wu | G01N 27/90 324/238 |
| 2013/0194412 A1* | 8/2013 | Hatcher | F01D 21/003 348/82 |
| 2013/0194413 A1* | 8/2013 | Hatcher | G02B 23/2476 348/82 |
| 2013/0335530 A1* | 12/2013 | Hatcher, Jr. | G02B 23/2484 348/46 |
| 2013/0335549 A1* | 12/2013 | Hatcher, Jr. | H04N 7/18 348/82 |
| 2014/0185912 A1 | 7/2014 | Lim | |
| 2015/0168263 A1 | 6/2015 | Mueller | |
| 2015/0300920 A1* | 10/2015 | DeAscanis | G01M 15/14 356/614 |
| 2015/0319410 A1 | 11/2015 | Gu | |
| 2015/0341600 A1* | 11/2015 | Hatcher, Jr. | H04N 23/50 348/82 |
| 2017/0167285 A1* | 6/2017 | Diwinsky | F01D 17/02 |
| 2017/0234772 A1* | 8/2017 | Nirmalan | G01M 15/14 250/340 |
| 2019/0145761 A1* | 5/2019 | Ziegler | G01B 11/26 356/138 |
| 2020/0209163 A1* | 7/2020 | O'Loughlin | G01N 21/95692 |
| 2023/0315937 A1* | 10/2023 | Michaels | G05B 23/0283 703/7 |

OTHER PUBLICATIONS

Yang Yong et al. "3D Tracking for Borescope Inspections", Proceedings of SPIE, vol. 9489, May 14, 2015, pp. 9489L-1-94890L-10.

EP search report for EP22200542.3 dated Mar. 9, 2023.

* cited by examiner

INSPECTING AN INTERIOR OF A GAS TURBINE ENGINE APPARATUS

TECHNICAL FIELD

This disclosure relates generally to inspection and, more particularly, to inspecting an interior of an apparatus of a gas turbine engine.

BACKGROUND INFORMATION

A gas turbine engine includes various components with one or more internal volumes. It may be desirable to visually inspect one or more of these internal volumes during a manufacture process of a component and/or after a length of service of the component in the gas turbine engine. Various devices and methods are known in the art for inspecting an interior of a gas turbine engine component. While these known devices and methods have various benefits, there is still room in the art for improvement.

SUMMARY

According to an aspect of the present disclosure, an inspection method is provided. During this inspection method, an inspection scope is inserted into an interior of an apparatus of a gas turbine engine. An image of the interior of the apparatus is captured to provide image data. A location of the inspection scope within the interior of the apparatus when the image was captured is determined to provide location data, where the determining of the location includes comparing the image data to model data from a model of the apparatus. Movement of the inspection scope is tracked within the interior of the apparatus using the location data.

According to another aspect of the present disclosure, another inspection method is provided. During this inspection method, a sensor is inserted into an interior of an apparatus of a gas turbine engine. Feature data indicative of a feature within the interior of the apparatus is obtained using the sensor. A location of the sensor within the interior of the apparatus when the feature data was obtained is determined to provide location data, where the determining of the location includes comparing the feature data to model data from a model of the apparatus. One or more areas of the interior of the apparatus that have been inspected with the sensor are mapped using the location data.

According to still another aspect of the present disclosure, a system is provided for inspecting an interior of an apparatus. This system includes an image sensor and a processing system. The image sensor is configured to: insert into the interior of the apparatus; and capture an image of the interior of the apparatus to provide image data. The processing system is configured to: determine a location of the image sensor within the interior of the apparatus when the image was captured to provide location data, where the location is determined by comparing the image data to model data from a model of the apparatus; and map one or more areas of the interior of the apparatus that have been inspected with the image sensor using the location data.

The processing system may also be configured to identify one or more areas of the interior of the apparatus that have not been inspected with the image sensor using the location data.

The system may also include a borescope that includes the image sensor.

The inspection method may also include identifying one or more areas of the interior of the apparatus that have not been inspected with the sensor using the location data.

The inspection method may also include capturing an image of the interior of the apparatus to provide image data using the sensor. The image data may include the feature data.

The inspection scope may include an image sensor. The image may be captured using the image sensor.

The image sensor may be configured as or otherwise include a camera.

The image sensor may be arranged at a head of the inspection scope.

The model may be a CAD model of at least a portion of the interior of the apparatus.

The comparing of the image data to the model data may include comparing one or more surface features in the image to one or more surface features in the model.

The determining of the location may also include: determining a distance traveled by the inspection scope within the interior of the apparatus to provide distance data; and using the distance data during the comparing of the image data to the model data.

The inspection method may also include providing entry location data indicative of where the inspection scope enters the interior of the apparatus. The determining of the location may also include using the entry location data during the comparing of the image data to the model data.

The movement of the inspection scope within the interior of the apparatus may be tracked to map which one or more areas of the interior of the apparatus have been inspected with the inspection scope.

The movement of the inspection scope within the interior of the apparatus may be tracked to identify which one or more areas of the interior of the apparatus were not inspected with the inspection scope.

The inspection method may also include: linking the image data to the location where the image was captured to provided location-linked image data; and saving the location-linked image data for recall following removal of the inspection scope from the interior of the apparatus.

The interior of the apparatus may include a network of internal volumes.

The inspection scope may be inserted into the interior of the apparatus while the apparatus is separate from the gas turbine engine.

The inspection scope may be inserted into the interior of the apparatus while the apparatus is arranged with the gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
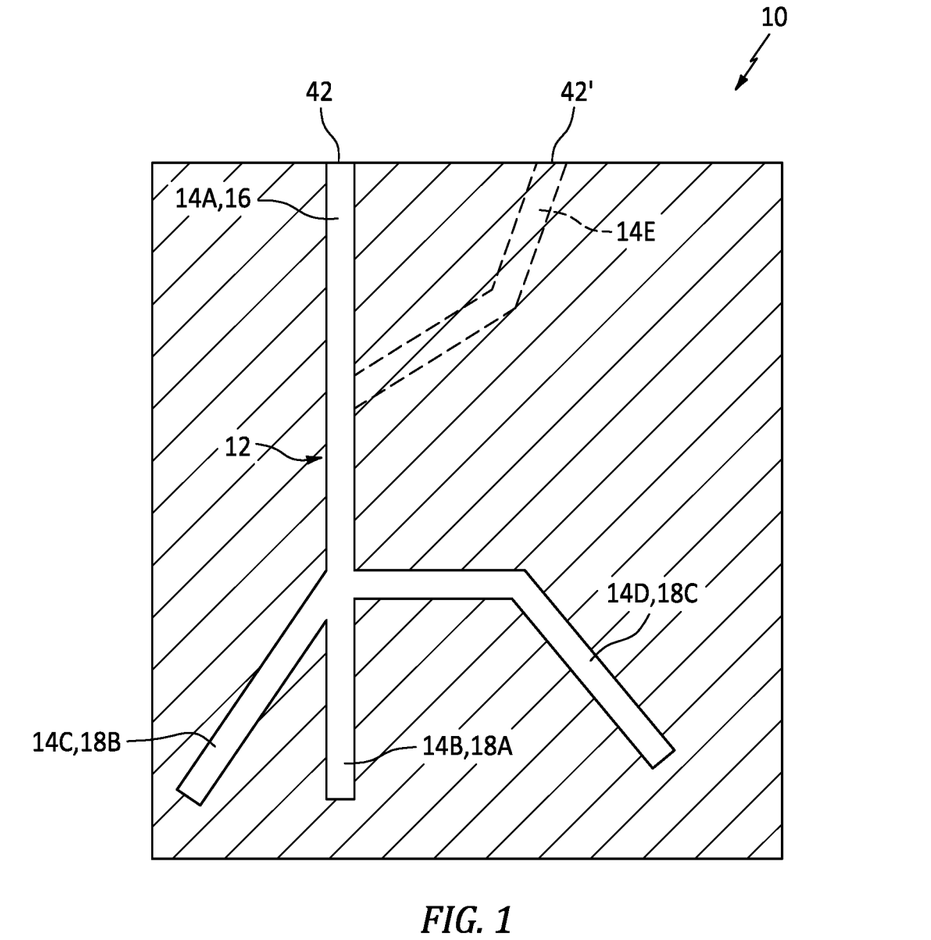
FIG. 1 is a schematic illustration of a gas turbine engine apparatus.

The present disclosure includes systems and methods for inspecting an interior of an apparatus for a gas turbine engine. FIG. 1 is a schematic illustration of such a gas turbine engine apparatus 10. This gas turbine engine apparatus 10 may be configured as or otherwise include a component of the gas turbine engine, an assembly of the gas turbine engine and/or a structure of the gas turbine engine. The gas turbine engine apparatus 10, for example, may be configured as a rotor blade, a stator vane, a vane array, a rotor disk, a shaft, a support structure, a reservoir or any other component, assembly and/or structure within the gas turbine engine with one or more internal volumes.

The gas turbine engine apparatus 10 of FIG. 1 includes an interior 12 with a network of one or more internal volumes 14A-E (generally referred to as "14"). These internal volumes 14 may be formed by one or more internal spaces, one or more internal cavities, one or more internal orifices and/or any other open areas within the gas turbine engine apparatus 10. At least a portion or an entirety of such internal volumes may not be visible from an exterior of the gas turbine engine apparatus 10, particularly where there is no straight line of sight from the exterior of the gas turbine engine apparatus 10 to one or more portions of a respective internal volume 14. The network of internal volumes 14 in FIG. 1, for example, includes a trunk passage 16 and one or more branch passages 18A-C (generally referred to as "18"), where the branch passages 18 are fluidly coupled with and branch off from the trunk passage 16. The (e.g., intermediate) branch passage 18A of FIG. 1 is arranged parallel with the trunk passage 16. The (e.g., side) branch passages 18B and 18C of FIG. 1 are angularly offset from the trunk passage 16. Material of the gas turbine engine apparatus 10 may thereby obstruct a line of sight to one or more portions of each branch passage 18. Furthermore, it may also be difficult to visually observe one or more surfaces forming the branch passage 18 and/or the trunk passage 16 depending, for example, on a size (e.g., diameter) of the respective passage 16, 18 and/or a longitudinal length of the respective passage 16, 18.

The gas turbine engine apparatus 10 may be visually inspected at one or more points in a lifecycle of that apparatus 10. The gas turbine engine apparatus 10, for example, may be inspected during and/or following manufacture of the gas turbine engine apparatus 10 to check for flaws and/or otherwise verify design specifications of the gas turbine engine apparatus 10. The gas turbine engine apparatus 10 may also or alternatively be inspected following use of the gas turbine engine apparatus 10. The gas turbine engine apparatus 10, for example, may be inspected following a predetermined number of flight cycles and/or engine operating hours. The gas turbine engine apparatus 10 may also or alternatively be inspected following suspected (e.g., FOD or other) damage to the gas turbine engine apparatus 10.

Figure 2:
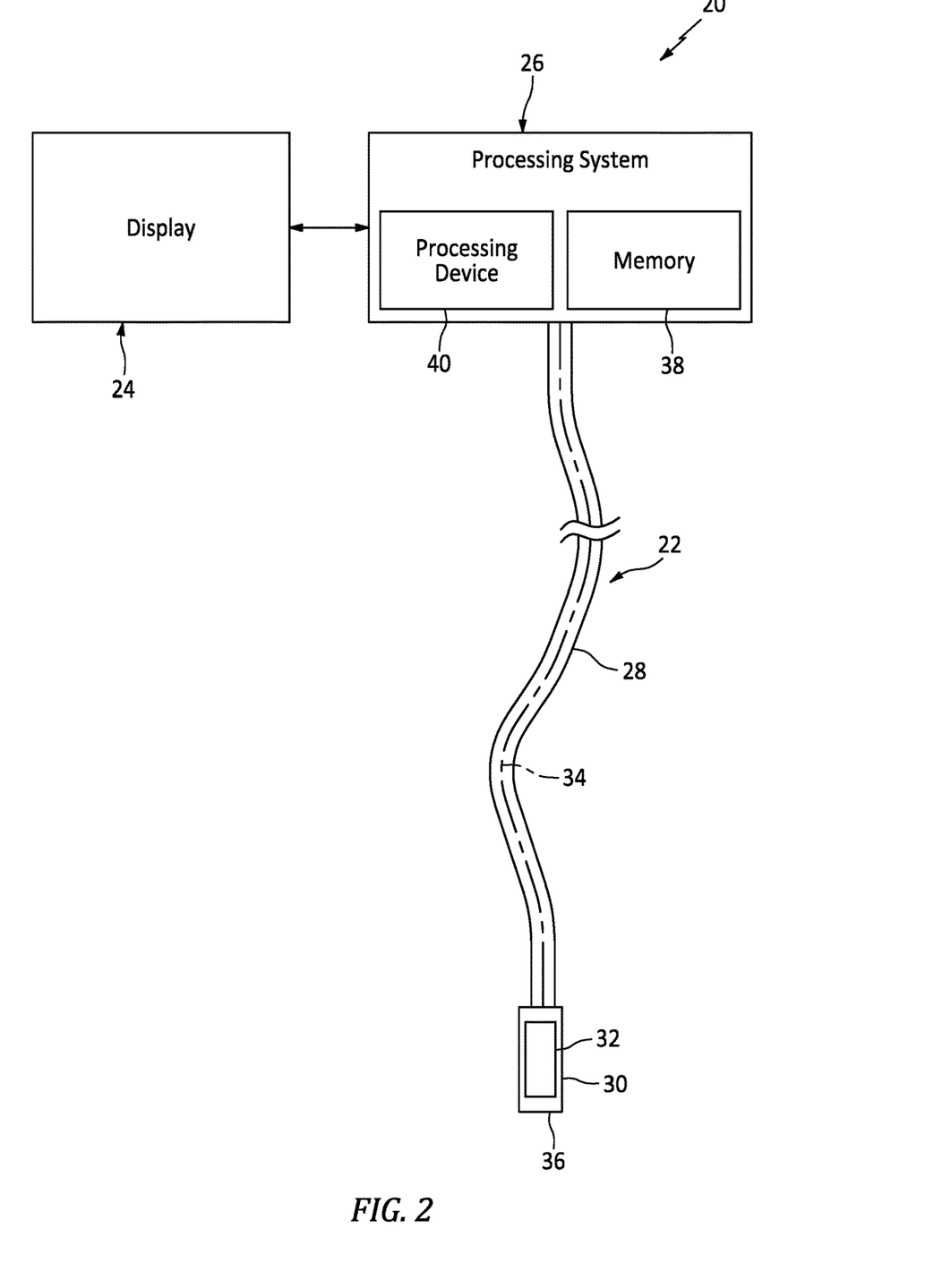
FIG. 2 is a schematic illustration of an inspection system.

During apparatus inspection, it may be desirable to visually inspect the apparatus interior 12 of the gas turbine engine apparatus 10. FIG. 2 is a schematic illustration of a system 20 for performing such an inspection. This inspection system 20 may be configured as a borescope inspection system. The inspection system 20 of FIG. 2, for example, includes an electronic inspection scope 22 (e.g., a borescope), a display 24 (e.g., a screen, a monitor, a touch screen, etc.) and a processing system 26.

The inspection scope 22 includes a scope body 28 (e.g., a tether), a scope head 30 and at least one scope sensor 32. The scope body 28 extends longitudinally along a longitudinal centerline 34 of the inspection scope 22 from a base end of the inspection scope 22 to the scope head 30. The scope body 28 is a flexible body. The scope body 28 may or may not include one or more internal actuators for manipulating a configuration of the inspection scope 22. The scope head 30 is disposed at a distal end 36 of the inspection scope 22. The scope sensor 32 is arranged with (e.g., mounted to and/or in) the scope head 30 and, thus, is disposed at (e.g., on, adjacent or proximate) the scope distal end 36. The scope sensor 32 is configured to collect, capture, sense and/or otherwise obtain feature data for the gas turbine engine apparatus 10 (see FIG. 1). The scope sensor 32, for example, may be configured as a camera (e.g., a still image camera and/or a video camera) configured to capture an image of one or more internal surfaces of the gas turbine engine apparatus 10.

The processing system 26 is configured in signal communication (e.g., hardwired and/or wirelessly coupled) with the inspection scope 22 and its scope sensor 32 as well as the display 24. The processing system 26 of FIG. 2 may be in signal communication with the scope sensor 32 through one or more signal paths extending within the scope body 28.

The processing system 26 may be implemented with a combination of hardware and software. The hardware may include memory 38 and at least one processing device 40, which processing device 40 may include one or more single-core and/or multi-core processors. The hardware may also or alternatively include analog and/or digital circuitry other than that described above.

The memory 38 is configured to store software (e.g., program instructions) for execution by the processing device 40, which software execution may control and/or facilitate performance of one or more operations such as those described in the methods below. The memory 38 may be a non-transitory computer readable medium. For example, the memory 38 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 3:
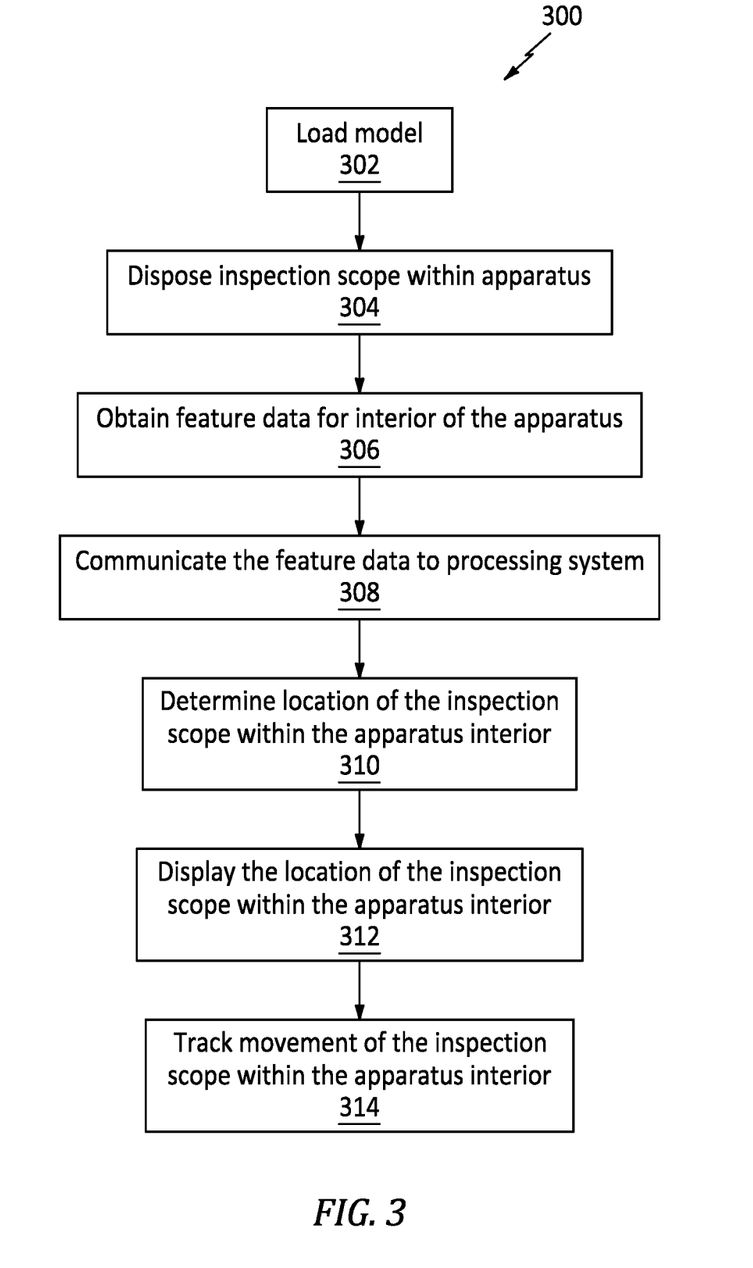
FIG. 3 is a flow diagram of a method for inspecting an interior of the gas turbine engine apparatus.

FIG. 3 is a flow diagram of a method 300 for inspecting an apparatus of a gas turbine engine. For ease of description, the method 300 is described below with reference to the gas turbine engine apparatus 10 of FIG. 1 and the inspection system 20 of FIG. 2. The method 300, however, may alternatively be performed for inspecting other gas turbine engine apparatuses and/or performed using other inspection systems.

In step 302, a model of the gas turbine engine apparatus 10 is loaded into the processing system 26. This apparatus model may be a three-dimensional (3D) or two-dimensional (2D) computer model (e.g., computer aided design (CAD) model) of the gas turbine engine apparatus 10. The apparatus model, for example, may be the same model that provides design specifications for manufacturing the gas turbine engine apparatus 10. Alternatively, the apparatus model may be generated during another (previous) inspection and/or mapping of the gas turbine engine apparatus 10, or an inspection and/or mapping of another like gas turbine engine apparatus with the same configuration (e.g., another one of the same components).

Figure 4:
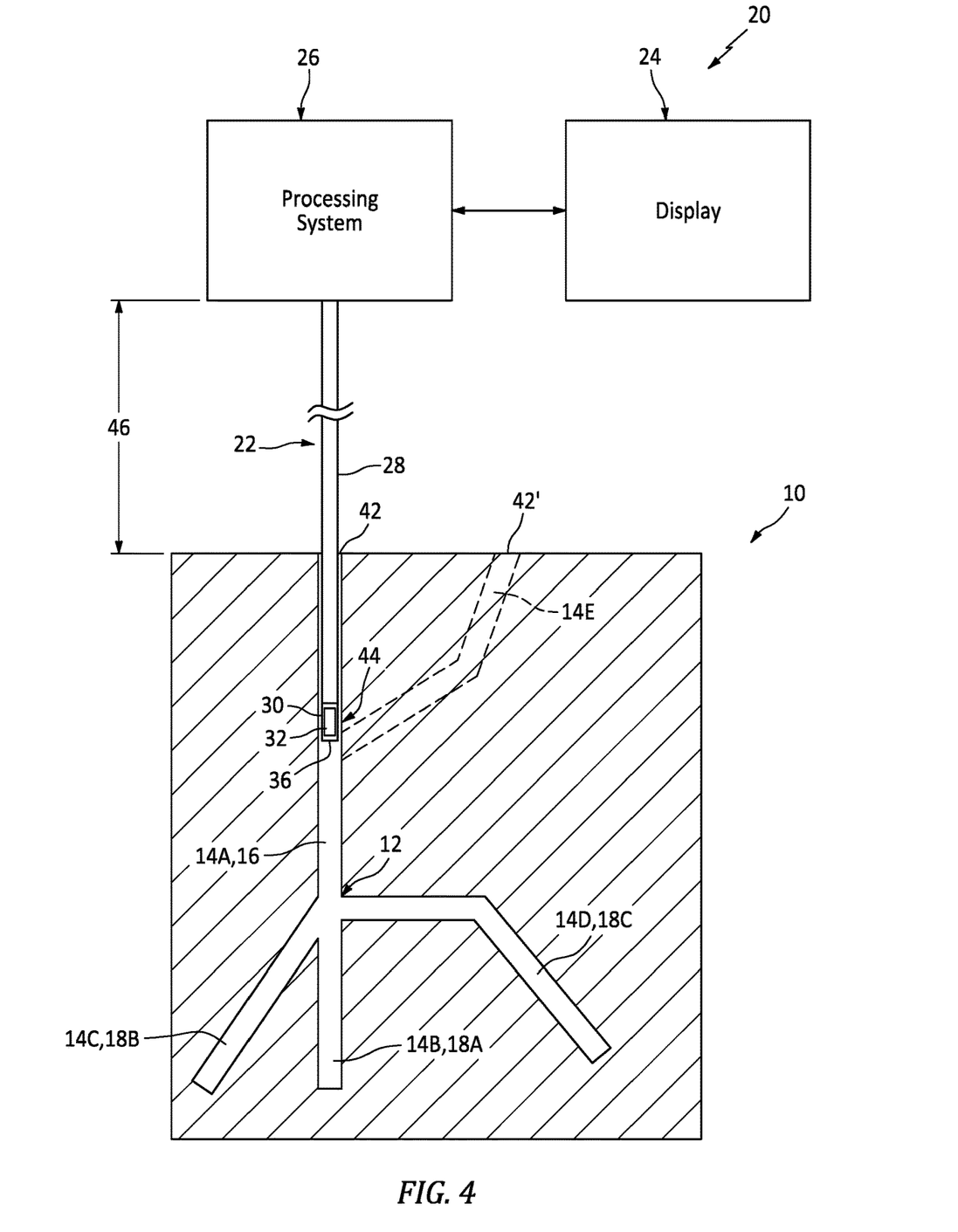
FIG. 4 is a schematic illustration of the inspection system arranged with the gas turbine engine apparatus.

In step 304, the inspection scope 22 is disposed within the apparatus interior 12. For example, referring to FIG. 4, the scope head 30 and a portion of the scope body 28 may be inserted into the apparatus interior 12 via an entry 42 (e.g., an opening) into the gas turbine engine apparatus 10. The scope head 30 and the scope sensor 32 are thereby disposed within a portion of one of the interior volumes 14 (e.g., 14A) of the gas turbine engine apparatus 10; e.g., the trunk passage 16 of FIG. 4.

In step 306, feature data indicative of one or more features of the gas turbine engine apparatus 10 within the apparatus interior 12 is obtained. The scope sensor 32 (e.g., the camera), for example, may capture (e.g., take) an image (e.g., a still image or a video) of one or more surfaces of the gas turbine engine apparatus 10 within the respective internal volume 14 (e.g., 14A). The scope sensor 32 may generate (e.g., live) image data indicative of one or more features from the image, which image data is or includes the feature data.

In step 308, the feature data (e.g., the image data) is communicated from the scope sensor 32 to the processing system 26.

In step 310, a (e.g., current) location 44 of the inspection scope 22 within the apparatus interior 12 is determined. More particularly, the processing system 26 processes the feature data (e.g., the image data) to determine the location 44 of the scope sensor 32/the scope head 30 within the apparatus interior 12 when the scope sensor 32 obtained the feature data; e.g., the location 44 where the camera captured (e.g., took) the image of the gas turbine engine apparatus surface(s). The processing system 26, for example, may compare one or more features in the feature data (e.g., the image data) to one or more features in model data from the model of the gas turbine engine apparatus 10. For example, using pattern recognition software, the processing system 26 may determine which surface(s) from the model most closely resemble the surface(s) in the image of the gas turbine engine apparatus 10. Where one of the surfaces in the image of the gas turbine engine apparatus 10 has a certain curvature, for example, the processing system 26 may look for surfaces in the model with similar curvatures. Where the processing system 26 finds a closest match between the curvature of the respective apparatus surface in the image and the curvature of a surface in the model, the processing system 26 may generate location data indicative of the location 44 of where the scope sensor 32 was mostly likely positioned within the apparatus interior 12 to capture the image of the respective surface(s). The location data may thereby identify the location 44 of the scope sensor 32/the scope head 30 within the apparatus interior 12. Of course, the processing system 26 may also or alternative compare other features such as, but not limited to, edges, protrusion types and/or arrangements, intersections, etc.

In some embodiments, the processing system 26 may also utilize additional data to aid in the comparison of the feature data (e.g., the image data) with the model data. For example, to narrow down a scope of search for a matching surface, the processing system 26 may use distance data and/or entry data. The distance data may be indicative of a distance traveled by the scope sensor 32/the scope head 30 within the apparatus interior 12. This distance traveled may be determined by measuring a longitudinal length 46 of a portion of the inspection scope 22 disposed outside of the gas turbine engine apparatus 10, which may then be subtracted from a known total longitudinal length of the inspection scope 22 to provide the distance traveled. The entry data may be indicative of which entry point (e.g., 42 or 42' to internal volume 14E) the inspection scope 22 entered the apparatus interior 12. This information may be particularly useful where the gas turbine engine apparatus 10 include more than one entry to its interior 12; e.g., see dashed line in FIGS. 1 and 4.

Figure 5:
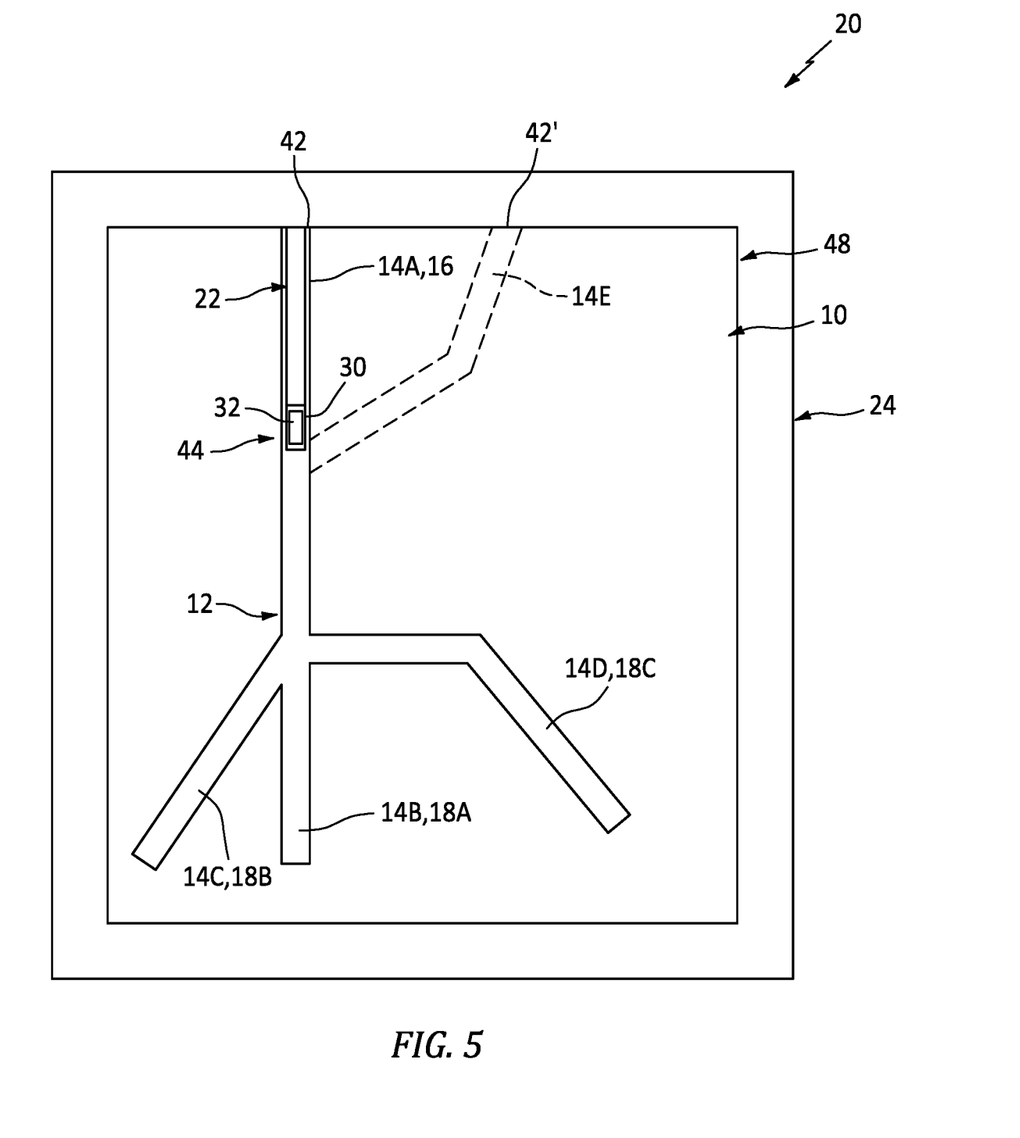
FIG. 5 is a schematic illustration of a display depicting a location of an inspection scope within the interior of the gas turbine engine apparatus.

In step 312, the (e.g., current) location 44 of the inspection scope 22 within the apparatus interior 12 is displayed. For example, referring to FIG. 5, the inspection system 20 may use the display 24 to present an image 48 of at least a portion (or an entirety) of the apparatus interior 12 generated from the model and overlay a current location (e.g., 44) of the inspection scope 22. An operator may thereby understand where the inspection scope 22 and its elements 30 and 32 are located within the apparatus interior 12. By contrast, without such a display, the operator may need to rely on experience and interpreting images obtained from the scope sensor 32 (e.g., the camera) to estimate where the inspection scope 22 and its elements 30 and 32 may be located. The display 24 of FIG. 2, of course, may also or alternatively be used to display the image(s) captured by the scope sensor 32.

Figure 6:
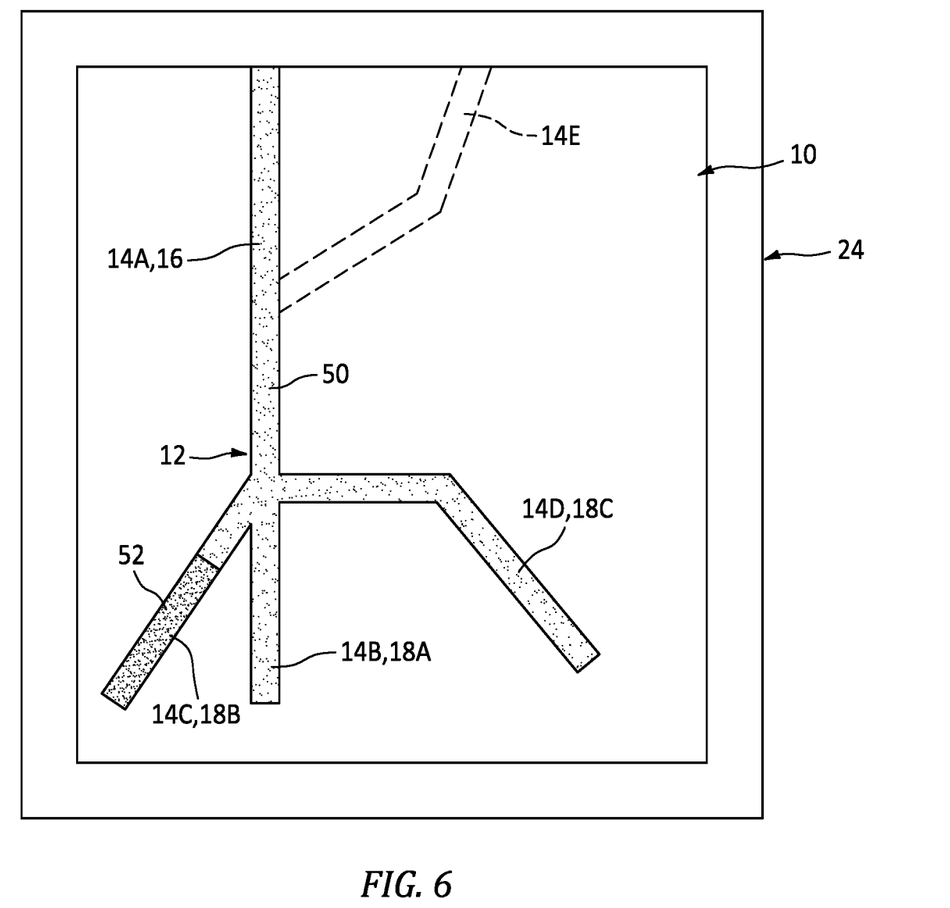
FIG. 6 is a schematic illustration of a display depicting a mapping of which areas have been inspected and which areas have not been inspected with the inspection system.

In step 314, movement of the inspection scope 22 is tracked within the apparatus interior 12 while, for example, the inspection scope 22 is within the apparatus interior 12. The processing system 26 of FIG. 2, for example, may record (e.g., save) the location data in the memory 38. The inspection scope 22 of FIG. 4 may then be inserted further into the apparatus interior 12 and the steps 306, 308, 310 and 312 may be repeated for this new location, and location data associated with the new location may also be recorded in the memory 38 (see FIG. 2). The inspection system 20 may thereby have a record of where the inspection scope 22 and its elements 30 and 32 moved within the apparatus interior 12. Referring to FIG. 6, this information may be utilized by the inspection system 20 and its processing system 26 to map one or more areas (e.g., see shaded area 50) of the apparatus interior 12 that were inspected using the inspection scope 22; e.g., see FIG. 6. The information may also or alternatively be utilized by the inspection system 20 and its processing system 26 to identify one or more areas (e.g., see shaded area 52) of the apparatus interior 12 that were not inspected using the inspection scope 22. The operator may thereby understand if a complete inspection of the apparatus interior 12 has been performed, which is particularly useful where the gas turbine engine apparatus 10 include many different (but visually similar) internal volumes 14.

In some embodiments, the image data may be linked with the location data associated with that image data to provide location-linked image data. This location-linked image data may be saved in the memory 38 (see FIG. 2) for subsequent recall; e.g., during and/or after the inspection with the inspection scope 22. Thus, the operator or other personnel may further review the image associated with a particular location of interest, for example, after the inspection scope 22 is removed from the gas turbine engine apparatus 10.

In some embodiments, the method 300 may be performed while the gas turbine engine apparatus 10 is separate (e.g., outside of, disassembled from, etc.) the gas turbine engine. In other embodiments, the method 300 may be performed while the gas turbine engine apparatus 10 is arranged with (e.g., installed in, etc.) the gas turbine engine.

The gas turbine engine apparatus 10 may be included in various types and configurations of gas turbine engines. The gas turbine engine apparatus 10, for example, may be included in a geared gas turbine engine where a gear train connects one or more shafts to one or more rotors in a fan section, a compressor section and/or any other engine section. Alternatively, the gas turbine engine apparatus 10 may be included in a gas turbine engine configured without a gear train; e.g., a direct drive gas turbine engine. The gas turbine engine apparatus 10 may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternative be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An inspection method, comprising:
    inserting an inspection scope into an interior of an apparatus of a gas turbine engine;
    capturing an image of the interior of the apparatus to provide image data;
    determining a location of the inspection scope within the interior of the apparatus when the image was captured to provide location data, the determining of the location comprising comparing the image data to model data from a model of the apparatus;
    displaying the location of the inspection scope within the interior of the apparatus, the displaying of the location comprising presenting an image of at least a portion of the interior of the apparatus with an overlay of the location of the inspection scope on a display, and the image generated from the model of the apparatus; and
    tracking movement of the inspection scope within the interior of the apparatus using the location data.

2. The inspection method of claim 1, wherein the model is a CAD model of at least a portion of the interior of the apparatus.

3. The inspection method of claim 1, wherein the comparing of the image data to the model data comprises comparing one or more surface features in the image to one or more surface features in the model.

4. The inspection method of claim 1, wherein the determining of the location further comprises
    determining a distance traveled by the inspection scope within the interior of the apparatus to provide distance data; and
    using the distance data during the comparing of the image data to the model data.

5. The inspection method of claim 1, further comprising:
    providing entry location data indicative of where the inspection scope enters the interior of the apparatus; and
    the determining of the location further comprises using the entry location data during the comparing of the image data to the model data.

6. The inspection method of claim 1, wherein the movement of the inspection scope within the interior of the apparatus is tracked to map which one or more areas of the interior of the apparatus have been inspected with the inspection scope.

7. The inspection method of claim 1, wherein the movement of the inspection scope within the interior of the apparatus is tracked to identify which one or more areas of the interior of the apparatus were not inspected with the inspection scope.

8. The inspection method of claim 1, further comprising:
    linking the image data to the location where the image was captured to provided location-linked image data; and
    saving the location-linked image data for recall following removal of the inspection scope from the interior of the apparatus.

9. The inspection method of claim 1, wherein the interior of the apparatus comprises a network of internal volumes.

10. The inspection method of claim 1, wherein the inspection scope is inserted into the interior of the apparatus while the apparatus is separate from the gas turbine engine.

11. The inspection method of claim 1, wherein the inspection scope is inserted into the interior of the apparatus while the apparatus is arranged with the gas turbine engine.

12. The inspection method of claim 1, wherein
    the inspection scope includes an image sensor; and
    the image is captured using the image sensor.

13. The inspection method of claim 12, wherein the image sensor comprises a camera.

14. The inspection method of claim 12, wherein the image sensor is arranged at a head of the inspection scope.

15. A system for inspecting an interior of an apparatus, the system comprising:
    an image sensor configured to
        insert into the interior of the apparatus; and
        capture an image of the interior of the apparatus to provide image data;
    a processing system configured to
        determine a location of the image sensor within the interior of the apparatus when the image was captured to provide location data, wherein the location is determined by comparing the image data to model data from a model of the apparatus; and
        map one or more areas of the interior of the apparatus that have been inspected with the image sensor using the location data; and
    a display configured to overlay the one or more areas of the interior of the apparatus that have been inspected with the image sensor on an image of at least a portion of the interior of the apparatus, wherein the image is generated using the model of the apparatus.

16. The system of claim 15, wherein the processing system is further configured to identify one or more areas of the interior of the apparatus that have not been inspected with the image sensor using the location data.

17. The system of claim 15, further comprises a borescope that comprises the image sensor.

* * * * *